United States Patent [19]

Montino et al.

[11] Patent Number: 4,902,494
[45] Date of Patent: Feb. 20, 1990

[54] PROCESS FOR PREPARING HYDRATED ALUMINA CONSISTING ESSENTIALLY OF SPHERICAL PARTICLES BY HOMOGENEOUS PRECIPITATION

[75] Inventors: Franco Montino, Alessandria; Giuseppe Spoto, Torino, both of Italy

[73] Assignee: Montedison S.p.A., Milan, Italy

[21] Appl. No.: 357,675

[22] Filed: May 26, 1989

Related U.S. Application Data

[63] Continuation of Ser. No. 143,265, Jan. 6, 1988, abandoned, which is a continuation of Ser. No. 840,675, Mar. 18, 1986, abandoned.

[30] Foreign Application Priority Data

Mar. 19, 1985 [IT] Italy ............................. 19959 A/85

[51] Int. Cl.$^4$ ................................................ C01F 7/02
[52] U.S. Cl. ..................................... 423/625; 423/122; 423/127; 423/628; 423/629
[58] Field of Search ............... 423/122, 625, 628, 629, 423/127

[56] References Cited

U.S. PATENT DOCUMENTS 4,320,074 3/1982 Birchall et al. ..................... 423/625

FOREIGN PATENT DOCUMENTS 0117755 9/1984 European Pat. Off. .
11859A06 5/1977 U.S.S.R. .

OTHER PUBLICATIONS

Willard, Hobart H. and Tang, Ning Kang, "A Sudy of the Precipitation of Aluminum Basic Sulfate by Urea", J. Am. Chem. Soc. 59, 1190–1196, (1937).

Brace & Matijevic, "Aluminum Hydrous Oxide Sols–I—Spherical Particles of Narrow Size Distribution", *J. Inorg. Nucl. Chem.*, 1973, vol. 35, pp. 3961–3705.

Catone and Matijevic, "Aluminum Hydrous Oxide Sols–II. Preparation of Uniform Spherical Particles by Hydrolysis of Al sec–Butoxide", *Journal of Colloid and Interface Science*, vol. 48, No. 2, Aug. 1974.

Wang and Shuster, "Polyelectrolyte Determination at Low Concentration," *Ind. Eng. Chem., Prod. Res. Dev.*, vol. 14, No. 4, 1975.

Collins et al., "Review of Common Methods of Particle Size Measurement", Journal of Paint Technology, vol. 47, No. 604, May 1975, pp. 35–56.

*Primary Examiner*—Robert L. Stoll
*Attorney, Agent, or Firm*—Stevens, Davis, Miller & Mosher

[57] ABSTRACT

A process for preparing hydrated alumina consisting essentially of spherical particles having a narrow granulometric distribution (polydispersion index dw/dn$\leq$2) starting from aqueous solution of aluminum sulphate, the molar ratio $SO_4^=/Al^{3+}$ being greater than 1, by homogeneous precipitation in the presence of cationic polyelectrolytes, which are soluble under the reaction conditions and have a mean molecular weight higher than one million and an ionicity, deriving from the cationic groups present in the polyelectrolyte, of at least 3 milliequivalents/gram.

17 Claims, 3 Drawing Sheets

1 μm

1 μm

1 μm

1 μm

1μm

PROCESS FOR PREPARING HYDRATED ALUMINA CONSISTING ESSENTIALLY OF SPHERICAL PARTICLES BY HOMOGENEOUS PRECIPITATION

This application is a continuation of application Ser. No. 143,265, filed Jan. 6, 1988, now abandoned, which in turn is a continuation of application Ser. No. 840,675, filed Mar. 18, 1986, now abandoned.

This invention relates to a process for preparing hydrated alumina consisting essentially of spherical, non-aggregated particles having sizes below 1 micron or higher than 1 μm, up to a value of 3 μm.

In particular the invention relates to the preparation of hydrated alumina starting from aqueous solutions, comprising aluminum sulphate, by homogeneous precipitation.

BACKGROUND OF THE INVENTION

Hydrated alumina is utilizable as a precursor for preparing the various types of crystalline alumina consisting essentially of spherical particles which retain the same morphological and granulometric characteristics of the precursor. The preparation of alpha-alumina is described in particular in a preceding patent application filed by the Applicant hereof.

In its various crystalline forms, alumina has a wide range of uses, for example as material for electronics, in the preparation of substrates for semiconductors and in packing of integrated circuits, as ceramic material for manufacturing cutting tools, or as catalyst or catalyst support in heterogeneous catalysis.

From the technical and patent literature various methods are known for preparing hydrated alumina in the form of spherical, monodispersed or polydispersed with a low polydispersion index, and non-aggregated particles.

In Journal Inorg. Nucl. Chem. 1973, vol. 35, pages 3691-3705 (Roger Brace and Egon Matijevic) there is described a method for preparing hydrated, spherical, monodispersed alumina, having sizes below one micron prepared from aluminum sulphate solutions through forced hydrolysis at temperatures higher than 90° C., of the order of 100° C., during a time ranging from a few hours to a few days.

According to this article, it is of substantial importance to operate with aluminum sulphate solutions having $Al^{3+}$ concentration ranging from $2.10^{-4}$ to $5.10^{-3}$ moles/l in order to obtain products in the spherical and monodispersed form.

By operating with the concentrations indicated to be essential for obtaining alumina in the form of spherical and monodispersed particles, the precipitated hydrated alumina reaches the maximum value of 33% by weight after 4 days starting from $Al^{3+}$ solutions at concentrations of $1.10^{-3}$ moles/l.

By raising the $Al^{3+}$ concentration of the starting solution—the forced hydrolysis time being the same—the percentage of precipitated hydrated alumina tends to decrease. If hydrolysis is carried out at the same initial Al-salt concentrations during longer times, a re-dissolution of the precipitated alumina takes place, with further lowering of the precipitation yield.

The method described hereinabove is of no practical use from an industrial viewpoint, as the hydrated alumina productivity is very low, on the order of 1 mg/l. hour.

It is known too that if the forced hydrolysis of aluminum sec-butoxide is carried out in the presence of sulphate ions, it is possible to increase the reaction yield till reaching the theoretical yield, however it is necessary to operate always at very low $Al^{3+}$ concentrations, generally on the order of $10^{-3}$ moles/l, which lead to a productivity of the order of 50 mg/l. hour.

Processes of the type cited hereinbefore are described for example in "Aluminum Hydrous Oxide Sols. II. Preparation of Uniform Spherical Particles by Hydrolysis of Al-sec-Butoxide" P. L. Catone and E. Matijevic, Journal of Colloid Interface Science, Vol. 48, No 2, August 1974, page 291. By this process it is possible to obtain quantitative yields, but always with very low productivities, which require very complicated processes and utilize aluminum compounds having much higher costs than those of aluminum sulphate.

Also known are other processes for preparing hydrated alumina obtained starting from aluminum salts, such as sulphate, at concentrations of about 0.6 moles/l in the presence of a 10% ammonia aqueous solution.

Processes like this one are indicated in South African Pat. No. 555,052. However, the alumina obtained by this process is not in the form of monodispersed particles, but of polydispersed particles and, above all, aggregates are present because the precipitation does not occur homogeneously.

Other processes are known in which alumina is prepared starting from aluminum sulphate, in the presence of substances capable of releasing $OH^-$ ions under the action of heat so as to allow homogeneous precipitation in shorter times.

The term "homogeneous precipitation" means that any local over saturation phenomenon caused by a rapid contact of the aluminum salt solution with the alkaline solution does not occur.

Also with this method, however, the alumina, although obtained by a quantitative reaction, is not in the form of spherical particles and, mostly, it appears in the form of agglomerates if it is operated with starting $Al^{3+}$ concentrations higher than $5.10^{-3}$ moles/l.

There are known further methods for preparing alumina starting from aluminum nitrate or aluminum sulphate in the presence of succinic acid, of $NH_4Cl$ and urea, which provide a homogeneous precipitation. Neither in these cases, however, it is possible to obtain alumina in the form of spherical particles with a low polydispersion index, as aggregates are always present.

With a view to obtaining hydrated alumina with a controlled morphology and free from aggregates, with high and industrially interesting yields, processes like the ones described hereinabove, which comprise precipitation from solutions, are not utilized, but different techniques are used.

Preparation methods of this type are described e.g. in published patent application EP 117,755, according to which techniques are utilized that involve the preparation of an aerosol of liquid particles of a hydrolizable aluminum compound, which is successively reacted with water vapour to obtain the hydrated alumina in the form of solid particles.

DESCRIPTION OF THE INVENTION

It has now surprisingly been found that it is possible to prepare hydrated alumina consisting essentially of spherical, monodispersed, or polydispersed particles with a low polydispersion index, non-aggregated particles by means of methods of precipitation from solution and capable of providing very high yields.

Thus, the object of the present invention is a process for preparing hydrated alumina consisting essentially of spherical particles, having a measured polydispersion index dw/dn<2, in particular <1.20 (monodispersed particles), where dw is the weight average diameter of the particles and dn is the number average diameter, by starting from aqueous solutions comprising aluminum sulphate, the molar ratio: $SO_4^=/Al^{3+}$ being at least >1, and carrying out the precipitation in the presence of cationic polyelectrolytes, which are soluble under the reaction conditions and have an average molecular weight higher than 1 million and a ionicity of at least 3 milliequivalents/g (meq/g), said precipitation being conducted under such conditions as to obtain a homogeneous precipitation in the presence of substances capable of releasing $OH^-$ ions.

Generally, the $Al^{3+}$ concentration of the starting solution can reach values of 0.6 moles/l, preferably of 0.4 moles/l.

Preferably, the cationic polyelectrolytes have a ionicity higher than 3.5 meq/g and a molecular weight ranging from 1 to 6 millions.

It is unknown the mechanism which has surprisingly led to the obtainment of hydrated alumina consisting essentially of spherical, non-aggregated and practically monodispersed particles by carrying out a homogeneous precipitation of Al sulphate in the presence of the cationic polyelectrolytes of the invention having the characteristics mentioned hereinabove.

In fact, the reaction solution contains a very great number of ion types, such as e.g. $OH^-$ deriving both from the alkaline agent and from the hydrolysis in the reaction conditions, $Al^{3+}$ ions, anions, which derive from the aluminum salt, and optionally other ions which were introduced in order to obtain $SO_4^=$ concentration such as to comply with the above-mentioned $SO_4^=/Al^{3+}$ ratios and the cationic species which occur in the reaction conditions.

It has been found that the results of the invention are not achieved if use is made of anionic polyelectrolytes exhibiting the same combination of ionicity and molecular weight indicated for the cationic polyelectrolytes.

Analogously, the results of the invention cannot be obtained if polymers are utilized, which have the indicated molecular weight but comprise only neutral non-ionic repeating units.

The polyelectrolyte of the invention are employed in amounts higher than 2.5% by weight with respect to the theoretical amount of $Al_2O_3$ corresponding to the initial aluminum contained in the solution.

Preferably, polyelectrolyte amounts higher than 3% by weight, in particular of 3.3% by weight, are used.

The polyelectrolytes of the invention, before being used, are preferably dissolved in water in concentrations of a few g/l, generally of the order of 1 or 2 g/l.

It is possible to employ polyelectrolyte amounts higher than those indicated, for example of the order of 10 or 20% by weight, without giving rise to significant variations as regards morphology and granulometric distribution of the particles.

Generally it is possible to use also higher polyelectrolyte concentrations, provided the polyelectrolyte does not separate—in the reaction conditions—from the aqueous solution into a different phase.

The ionicity of the polyelectrolytes of the present invention is related to the number of cationic groups distributed along the whole polymeric chain. To obtain the results of the invention it is necessary that the cationic groups are regularly distributed in the polymeric chain; if not, a reduction of the polyelectrolyte activity occurs.

It has been found that ionic groups concentrations corresponding to at least 3 meq/g are the ones which provide the best results. Preferably, the amount of cationic groups is higher than 4 meq/g.

The quantitative determination of the cationic polyelectrolyte ionicity is accomplished according to known methods, using an anionic polyelectrolyte as titrating agent. The method employed in this invention is reported in "Polyelectrolyte Determination at Low Concentration" L. K. Wang and W. W. Shuster, Ind. Eng. Chem., Prod. Res. Dev., Vol. 14, No. 4, 1975, pages 312–314, and permits to calculate the milliequivalents per gram (meq/g) of positive charge present in the polyelectrolyte.

The anionic polyelectrolyte utilized as titrating agent is a commercial product, designated as PVSAK, consisting of the potassium salt of the polyvinylsulphonic acid.

Furthermore it has been found that the more linear the polyelectrolyte structure, the higher are the electrolyte performances. The molecular weight being equal, a polyelectrolyte having a ramified structure exhibits a lower activity. However, also cationic polyelectrolytes having side-chains are utilizable, provided they are soluble under the reaction conditions and are introduced in higher amounts.

Figure 1:
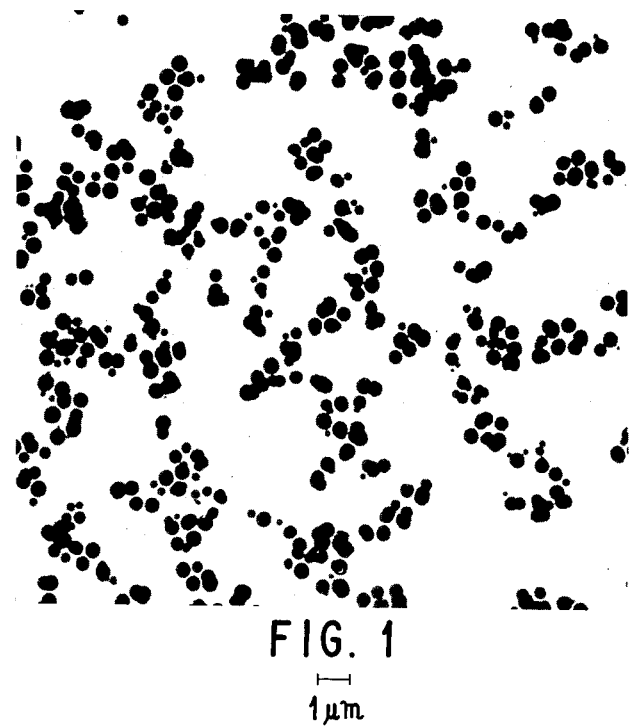
FIG. 1 shows a photograph of the particles produced by the method described in Example 1. The particles are magnified 4,850 times.

The polyelectrolytes which have proved to be particularly suitable for the process of the invention are polymers comprising repeating units based on substituted acrylamide and having general formula:

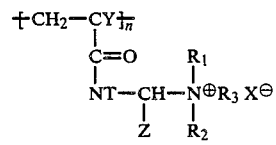

wherein $R_1, R_2, R_3$ T are like or unlike one another and are selected from H, an aliphatic hydrocarbon radical having from 1 to 4 carbon atoms;

Y is H or $-CH_3$;

Z is H or $-CH_3$;

X is an anion, in particular chloride or sulphate;

n is an integer.

The polymers including the above-indicated units are obtained from non-ionic polyacrylamide by means of conventional reactions, for example through the Mannich reaction.

Other cationic polyelectrolytes employable are the polyvinylamines, which can be obtained from the polyacrylamides through the Hoffmann degradation reaction and subsequent quaternization of the nitrogen atom, according to known techniques, or through polymerization, conforming to known processes, of vinylamines and subsequent quaternization of nitrogen, said polyvinylamines having general formula:

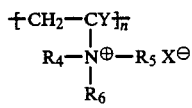

wherein $R_4$, $R_5$, $R_6$ are defined as $R_1$ indicated hereinbefore; X, Y and n are the same as previously specified.

The preferred compounds are those in which: Y, Z, T, $R_3$ and $R_4$ are H and $R_1$, $R_2$, $R_6$ are equal or different from one another and are selected from among H, —$CH_3$ or —$C_2H_5$.

The polymers which comprise the cationic units indicated hereinbefore may also contain neutral units of unsubstituted acrylamide of the general formula:

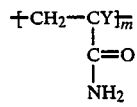

wherein m is an integer and in which Y is the same as defined above.

The neutral and cationic units are statistically distributed along the polymer chain, the ionicity and the molecular weight having the indicated values.

However, it is possible to use also copolymers in which the neutral unit can be selected from among the following:

 (a1)

in which R=H, or an aliphatic hydrocarbon radical from 1 to 4 carbon atoms;

 (a2)

wherein $R_7$ has the same meaning as R;

 (a3)

wherein $R_8$ has the same meaning as R;

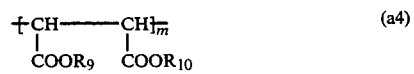 (a4)

wherein $R_9$ and $R_{10}$ have the same meaning as R;

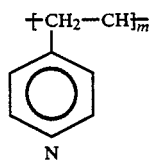 (a5)

units deriving from polyvinylpyridines;
m in the various classes is as defined hereinabove.

The copolymers containing the cationic units of acrylamide and the indicated neutral groups are prepared according to processes of the prior art.

In particular the polymers comprising the indicated ionic units and the groups of class (a1) are obtained by polymerization of an olefin $CH_2$=CHR with acrylamide; the polymers of class (a2) by polymerization of acrylamide with an acrylic acid ester; the polymers of class (a3) by copolymerization of vinylether with acrylamide; the polymers of class (a4) by copolymerization of maleic acid with acrylamide; the polymers of class (a5) by copolymerization of acrylamide with vinylpyridine.

The various neutral units indicated in the various groups can be present also simultaneously in the polymeric chain if more monomers are contemporaneously polymerized, the previously indicated molecular weight and ionicity values being in any case always observed.

The combinations of the various radicals contained in the above-indicated neutral and cationic groups are however selected, in such manner as to provide polymers which are soluble under the utilization conditions of the present invention.

In the various classes, the hydrocarbon radicals with 1 or 2 carbon atoms are particularly preferred.

The polyelectrolytes of the class of the polyamides are commercial products designated as Ecoclar, Praestol, Separan, and are available both in the solid state and in emulsions.

Preferably they are utilized by preparing water solutions of the commercial polyelectrolyte at concentrations of 1–2 g/l at the moment of their use and by drawing the necessary amount. In fact, the water solutions of these polyelectrolytes are stable for a short time, generally no longer than a few days.

The uniform precipitation is achieved by introducing, into the reaction medium, substances capable of gradually and uniformly releasing $OH^-$ so as to avoid local oversaturations of the solution.

Any substance capable of releasing $OH^-$ ions in the above-indicated manner may be utilized. As preferred compounds there can be cited, for example, urea and formamide. In the process of the present invention it is operated at those temperatures at which the substance is capable of releasing $OH^-$. However, in order to obtain quantitative yields of hydrated alumina in a short time it is necessary to operate at such temperatures that the release of the $OH^-$ ions may occur as quickly as possible.

Urea, for example, begins to release $OH^-$ ions at relatively low temperatures, on the order of 60° C. But also operating at temperatures around 80° C. quantitative yields of alumina would be obtained in too long times, on the order of several hours, or it would be necessary to utilize very high urea amounts, which would involve an increase in costs and difficulties in solubilizing both the urea and the polyelectrolyte to obtain homogeneous solutions.

It is preferable to operate at temperatures from 90° to 100° C. in order to complete the precipitation in very short times.

In these conditions, urea/Al molar ratios ranging from 4 to 12, preferably from 6 to 9, are employable. In these conditions, the alumina quantitative precipitation times are of a few hours, generally of 1 to 4 hours, and the spherical particles sizes are practically independent of the employed urea/Al ratios.

It can be operated at atmospheric pressure or under pressure, in the latter case the times being further reduced.

As aluminum salt, aluminum sulphate is preferably utilized but it is also possible to use mixed aluminum sulphates, such as e.g. those containing potassium, sodium and ammonium.

Generally, also a mixture of the above-cited aluminum salts can be used; it is possible to operate in the presence of sulphate ions obtained by addition for example of sodium sulphate, ammonium sulphate and potassium sulphate.

It is possible also to use mixture of aluminum sulphate with aluminum nitrate, chloride, perchlorate, acetate, formate, provided the amount of $Al^{3+}$ deriving from the salts other than the sulphate is of the order of 5–10%, generally not higher than 20% by weight referred to the total aluminum introduced.

The results of the invention are all the more surprising as it has been found that, when starting from aluminum salt solutions containing about 30% by moles of $Al^{3+}$ in the form of chloride and the remaining part in the form of sulphate, even by operating in the presence of sulphate ions in such amounts as to have a $SO_4^{=}/Al^{3+}$ ratio ranging from 1 to 1.5 and by operating according to the process of the invention, the resulting hydrated alumina does not exhibit the spherical morphology and contains aggregates.

The same negative results are obtained when using $Al(NO_3)_3$ instead of $AlCl_3$ at the indicated concentrations.

The hydrated alumina obtained by the process of the invention appears, under the X-ray powder analysis, to be in the amorphous phase.

Crystalline alumina with a variable water content, having the same morphology and granulometric distribution as the amorphous alumina of the invention is obtainable by subjecting the hydrated alumina of the invention to thermal treatments according to known processes. By carrying out a particular heat treatment described in a preceding Italian patent application No. 19142A/85 filed by the Applicant hereof it is possible to obtain also the alpha phase having the same granulometric and morphological characteristics of the amorphous precursor. The applicant has observed that with the particular hydrated alumina obtained with the process of the present invention it is possible to carry out the heat-treatment, that is combination of times and temperatures also out of the lines of the FIG. 1 indicated in application 19124 A/85, in order to obtain alpha alumina maintaining the spherical form of the precursor.

The average sizes (dw and dn) as well as the morphological and granulometric characteristics are determined under the electron microscope by the TEM technique. The method of determining dw and dn is described by E. A. Collins, J. A. Davidson and C. A. Daniels in "Review of Common Methods of Particles Size Measurement", Journal of Paint Technology, Vol. 47, No. 604, May 1975.

The hydrated alumina particles obtained by the process of the present invention have diameters ranging from 0.06 to 3 $\mu$m.

Generally, the highest yields are obtained in the range from 0.1 to 2 $\mu$m. Productivities of the order of 1–25 g/l. hour are easily achievable through the process of the invention; generally, the greater the particles diameter, the higher is the productivity.

Actually it has been found that the diameter of the spherical particles of hydrated alumina is strictly related to the Al concentration of the starting solutions.

For example, starting from Al concentrations of 0.1 moles/l and operating under the preferred conditions of the invention, sizes of about 0.3 $\mu$m are obtained, the productivity being about 5 g/l. hour. Using starting Al concentrations of 0.2 moles/l, the alumina diameter is about 0.5 $\mu$m and the productivity about 10 g/l. hour; with Al concentrations of 0.3M, the diameter ranges from 0.7 to 0.8 $\mu$m, with the productivity being 15 g/l. hour; with Al concentrations of 0.4M, the diameter is 0.8 $\mu$m and the productivity 20 g/l. hour.

Using solutions at Al conc. of 0.025M, diameters of about 0.1 $\mu$m are obtained, the productivity being of approximately 2 g/l. hour.

The diameter of the alumina particles is also influenced by the stirring of the reaction medium, provided said stirring is such as to cause a turbulence in the system.

The starting concentrations being equal, an intense stirring permits greater diameters.

For example, starting from an initial concentration of 0.2M of Al, particles of about 1 micron diameter are obtained.

The effect of stirring is briefly illustrated in the examples.

The alumina obtainable by the process of the present invention is very pure. The highest impurity, which, desirably, should be reduced to the minimum, consists in sulphur which derives from the use of the aluminum sulphate solution, which is necessary in order to obtain the results of the process of this invention.

It has been found that the sulphur amount strictly depends on the final pH of the suspension at the end of precipitation.

By heating the $Al^{3+}$ salt solution in the presence of urea to a temperature around 100° C. it is possible to observe a slow but progressive increase in the pH, from starting values of 1.5–2.5 (as a function of the $Al^{3+}$ salt concentration and of the molar ratio urea/$Al^{3+}$ up to values around 3–3.5. The formation of the hydrated alumina precipitate occurs during this step, successively, a quick increase in the pH up to values of 4.5–5.5 takes place, whereafter the pH increase considerably slows down. At pH values around 4, the precipitation of $Al^{3+}$ can be considered as concluded, wherefore now the precipitate can be separated from the mother liquors by means of any technique suited to the purpose, such as for example centrifugation and filtration. In particular, when the latter technique is utilized, it may be advantageous to subject the particles at first to a flocculation treatment to facilitate the filtration.

Dilute solutions (0.1–0.5 g/l) of an anionic polyelectrolyte are particularly suited to such purpose. The flocculated product can be also washed by decantation. The flocculation treatment does not involve any modification of the granulometric characteristics of the individual alumina particles.

Although the $Al^{3+}$ precipitation is already complete at a pH value of 4, it may be sometimes preferable to reach pH values higher than 4, because it has been found that the higher is the pH of the suspension, the higher is the purity, in terms of sulphur content, of the precipitated Al hydroxide.

By operating in this manner, the following sulphur percentages in the hydrated alumina, dried at about 100° C., are obtained:

| pH  | S   |              |
|-----|-----|--------------|
| 4   | 6.1 | (% by weight)|
| 5.5 | 3.7 | (% by weight)|
| 6   | 2.6 | (% by weight)|

Of course it is possible to further increase the pH by heating for longer times in the presence of urea; the same effect, however, is attainable by direct addition of alkali to the suspension. In fact, at pH 4 the precipitation of $Al^{3+}$ is complete, the addition of alkali does not cause, at this point, any uncontrolled nucleation phenomena, but only an increase in the pH of the suspension. It is necessary that the final pH should not exceed a value of 6, because higher pH leads to particle aggregation and to loss of sphericity.

It is possible to further reduce the sulphur content in the precipitated hydroxide by suspending the same, after removal of the mother liquors, in alkaline solutions, at pH values ranging from 8 to 9.5 and at temperatures of from 15° C. to 50° C.

As alkaline solutions, $NH_4HCO_3$ solutions at 1-3% by weight, additioned with ammonia solution in such amount that the pH of the hydrated alumina suspension can reach the pre-selected value, prove to be advantageous.

The final sulphur obtained after the treatment described hereinbefore reaches values of 0.6% by weight.

Furthermore it is possible to further reduce the sulphur content by carrying out thermal treatments.

The hydrated alumina of the invention which is always obtained in the amorphous phase, as results from the X-ray powder spectrum, can be converted, as already pointed out herein, to the various crystalline forms through thermal treatments. It has been found, however, that an almost complete removal of sulphur is obtained if the amorphous hydrated alumina utilized as a precursor contains the least possible amount of sulphur.

By effecting heat treatments, as stated above and described in a preceding patent application filed by the applicant hereof, with a view to obtaining alpha $Al_2O_3$ consisting essentially of particles which retain the same granulometric and morphological characteristics of the precursor, final sulphur amounts below or equal to 25 ppm are reached.

The following examples are given for a merely illustrative purpose, without being however a limitation of the present invention.

EXAMPLE 1

0.3 g of a commercial polyelectrolyte, ECOCLAR 8017, were dissolved, under stirring, in 480 ml of $H_2O$. The polyelectrolyte had a molecular weight of 3-4 million and a positive ionicity, measured by titration with PVSAK, of 4.94 milliequivalents/g (meq/g).

The solution was introduced into a 1-liter flask equipped with a reflux cooler, an electrode for the pH measurement and a thermometer. 100 ml of a solution containing 200 g/l of commercial $Al_2(SO_4)_3.18\ H_2O$ (0.6 moles/l of $AL^{3+}$) and, at last, 32.4 g of urea were added. The final volume of the solution was of about 600 ml. It was heated to 100° C. without stirring. During about 60 minutes the pH rose from 2.6 to 5.0. Already at pH 3 the solution began to turn opalescent and it became more and more turbid as the pH increased. The suspension was centrifuged, the product was washed and dried at 120° C. for a few hours to constant weight.

Obtained were 5.9 g of hydrated alumina which, subjected to TEM analysis, revealed to consist essentially of spherical, uniform, almost monodispersed particles (dw/dn=1.1) with a mean diameter around 0.3 $\mu m$.

FIG. 1 shows a photograph of the sample; the magnification is of 4850 times. The X-ray spectrum of the powders indicates that the product was amorphous.

EXAMPLE 1 (COMPARATIVE TEST).

Into a 1-liter flask, equipped with reflux cooler, electrode for the pH measurement and thermometer, there were introduced 100 ml of a solution containing 200 g/l of $Al_2(SO_4)_3.18\ H_2O$ (0.6 moles/liter of Al). A solution of 32.4 g of urea in 480 ml of $H_2O$ was added. It was heated to 100° C., without stirring. At 100° C., the pH of the solution was 2.6. During 60 minutes the pH rose to 5.0.

Figure 2:
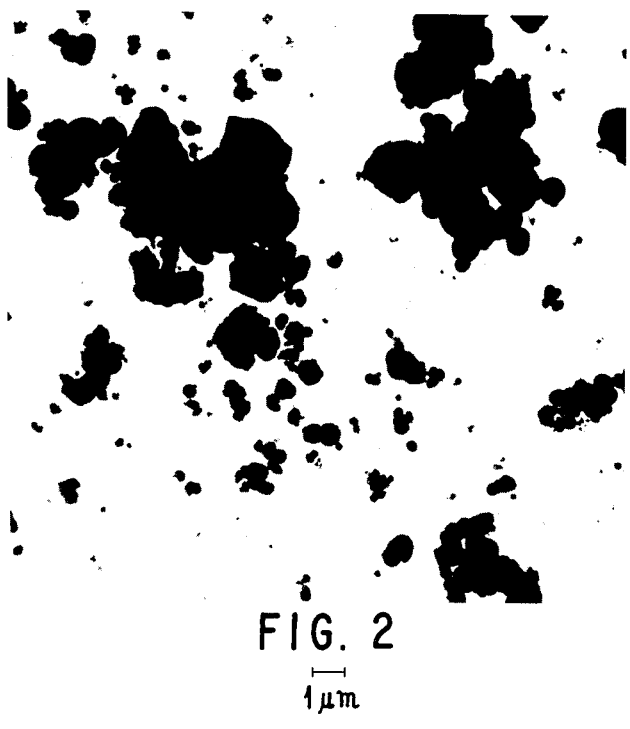
FIG. 2 shows a photograph of the particles produced by the method described in comparative Example 1. The particles are magnified 4,850 times.

The precipitate was filtered, washed and dried at 120° C. for a few hours. It weighed 5.8 g; the X-ray analysis revealed that it consisted of an amorphous phase; on TEM analysis (FIG. 2, magnification 4850 times), it resulted to consist of particles of various sizes, very aggregated and without well defined morphological characteristics; in particular, no presence of spherical particles was observed.

EXAMPLE 2

0.3 g of ECOCLAR 8017 was dissolved in 350 ml of $H_2O$ under stirring. The solution was introduced into the reactor described in example 1, along with 200 ml of a solution containing 200 g/l of $Al_2(SO_4)_3.18\ H_2O$ and with 64.8 g of urea. The final volume of about 600 ml. It was heated to 100° C. without stirring, till the pH reached a value of 5.0 (in about 60 minutes).

The obtained precipitate, after separation from the mother liquors by centrifugation, under TEM analysis resulted to consist essentially of spherical, uniform and almost monodispersed particles having a mean diameter of about 0.5 $\mu m$. The X-ray spectrum of the powders of the sample revealed that alumina was amorphous.

EXAMPLE 3

Figure 3:
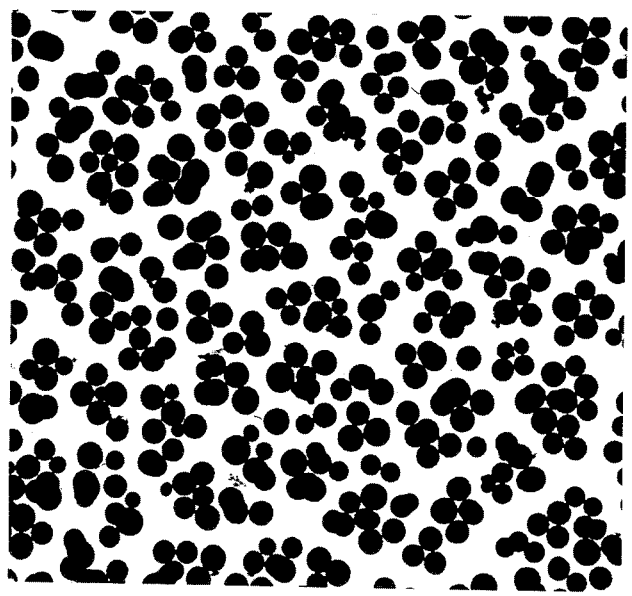
FIG. 3 shows a photograph of the particles produced by the method of Example 3. The particles are magnified 4,850 times.

The test of example 2 was repeated under the same conditions, but using 43.2 g of urea. The time required to attain a pH of 5.0 was of approximately 100 minutes. The TEM analysis of the precipitate (FIG. 3, magnification 4850 times) did not indicate substantial variations with respect to that of example 2 as regards the morphological and granulometric characteristics; the diameter of the spherical particles was equal to 0.5 $\mu m$. Subjected to X-rays, the product proved to be amorphous.

EXAMPLE 4

Figure 4:
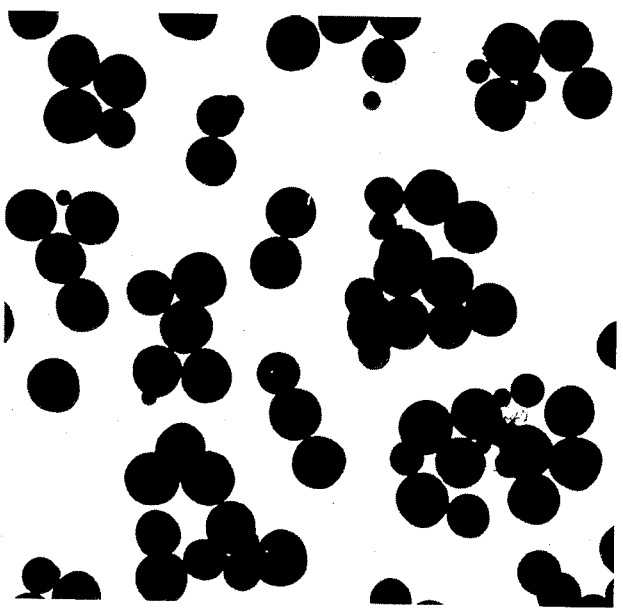
FIG. 4 shows a photograph of particles produced by the method of Example 4.

The test of example 3 was repeated using the same reactor, but stirring the solution by means of a blade stirrer rotating at about 500 r.p.m. The TEM analysis of the precipitate evidenced a remarkable growth of the granules—the sizes thereof being in fact around 1.2 μm.—and a dw/dn equal to 1.15. The morphology of the particles, however, did not exhibit any changes. A TEM photograph of the sample is shown in FIG. 4. The X-ray analysis revealed that the sample was amorphous.

EXAMPLE 5

A test was repeated under the same conditions as in example 2, but using 28.8 g of urea. The time necessary to reach a pH of 5.0 was of approximately 220 minutes. The TEM analysis of the sample did not show any substantial variation as compared with the one of example 2; the X-ray spectrum of the powders revealed that the product was amorphous.

EXAMPLE 6

The test of example 3 was repeated under the same conditions, but heating the solution to 95° C. instead of to 100° C. The time required to reach a pH of 5.0 was of about 240 minutes. The TEM analysis of the precipitate did not reveal any substantial variations with respect to the one of example 3.

EXAMPLE 7

0.3 g of polyelectrolyte ECOCLAR 8017 were dissolved in 220 ml of $H_2O$ under stirring.

The solution was introduced into the reactor described in example 1, along with 300 ml of a solution containing 200 g/l of $Al_2(SO_4)_3.18\ H_2O$ and 97.2 g of urea. The solution (final volume of about 600 ml) was heated to 100° C. without stirring, till a pH value of 5.5 (in about 70 minutes) was attained. The TEM analysis of the precipitate proved that it consisted essentially of spherical particles having a mean diameter of 0.75 μm.

EXAMPLE 8

0.076 g of polyelectrolyte ECOCLAR 8017 were dissolved in 100 ml of $H_2O$ under stirring.

Figure 5:
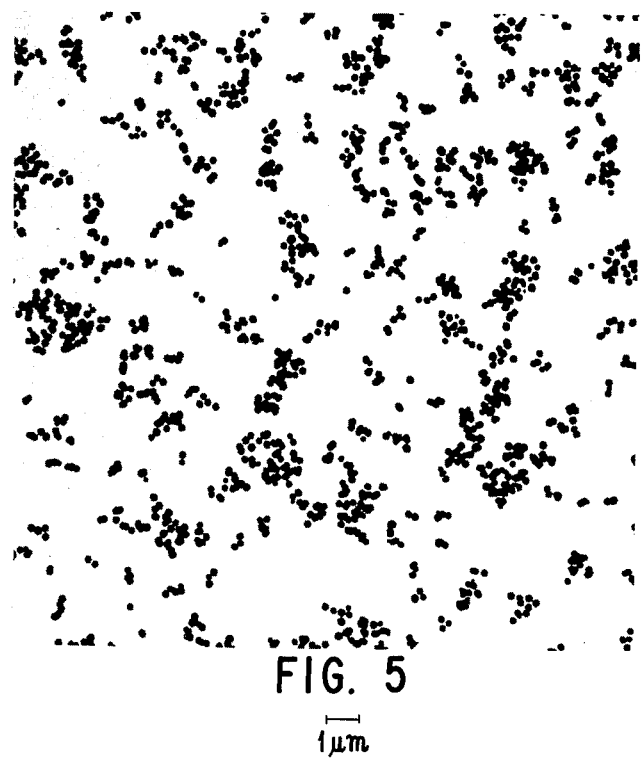
FIG. 5 shows a photograph of particles produced by the method described in Example 8. The particles are magnified 4,850 times.

The solution was introduced into the reactor described in example 1, equipped with a blade stirrer rotating at about 60 r.p.m. After having diluted the solution with 470 ml of $H_2O$, 25 ml of a solution containing 200 g/l of $Al_2(SO_4)_3.18\ H_2O$ and 8.1 g of urea were added thereto. The resulting solution (final volume of about 600 ml) was heated to 100° C. under stirring till reaching a pH value of 5.0 (about 65 minutes). The TEM analysis of the precipitate revealed that it consisted essentially of spherical particles having a mean diameter of about 0.11 μm. A photograph of the sample is shown in FIG. 5. (Magnification 4850 times).

EXAMPLE 9

1.2 g of polyelectrolyte ECOCLAR 8017 were dissolved in 400 ml of $H_2O$, under stirring.

The solution was poured into the reactor described in example 1, equipped with a blade stirrer rotating at about 60 r.p.m. 200 ml of a solution containing 200 g/l of $Al_2(SO_4)_3.18\ H_2O$ and 42.2 g of urea were added. The solution (final vol. of about 650 ml) was heated to 100° C. under stirring till reaching a pH value of 5.0 (approximately 90 minutes). The TEM analysis of the precipitate indicated that it consisted essentially of spherical particles having a mean diameter around 0.45 μm and a particle size distribution similar to the one of example 3.

EXAMPLE 10

There were prepared a solution of 0.6 g of polyelectrolyte ECOCLAR 8017 in 300 ml of $H_2O$ and a solution of $Al_2(SO_4)_3$ by dissolving 80.0 g of $Al_2(SO_4)_3.18\ H_2O$ in such a water amount as is sufficient to obtain a volume of 250 ml.

The two solutions were transferred into the reactor described in example 1, equipped with a blade stirrer rotating at about 60 r.p.m. 86.4 g of urea were added and it was heated to 100° C. under stirring till reaching a pH value of 5.0 (about 90 minutes).

The TEM analysis of the precipitate revealed that it consisted essentially of spherical particles with a mean diameter around 0.8 μm.

EXAMPLES 11–26

The test of example 2 was repeated, but varying every time the type of electrolyte employed and/or the introduced amount. In table 1, the results obtained from the TEM analysis of the precipitate are indicated as positive (P) or negative (N) depending on whether the sample consisted of spherical, almost monodispersed, sub-micronic particles, or of polydispersed aggregates and non-spherical particles.

TABLE 1

| Example | Polyelectrolyte | Amount (g) | Result |
|---|---|---|---|
| 11 | ECOCLAR 8337 | 0.3 | P |
| 12 | ECOCLAR 8032 | 0.3 | N |
| 13 | ECOCLAR 8032 | 0.6 | N |
| 14 | ECOCLAR 8032 | 0.9 | N |
| 15 | ECOCLAR 8038 | 0.3 | N |
| 16 | CYANAMER P250 | 0.3 | N |
| 17 | ECOCLAR 8008 | 0.3 | N |
| 18 | ECOCLAR 8008 | 0.9 | N |
| 19 | ECOCLAR 8002 | 0.3 | N |
| 20 | ECOCLAR 8105 | 0.3 | N |
| 21 | PRAESTOL 444K | 0.3 | P |
| 22 | PRAESTOL 334K | 0.3 | P |
| 23 | ECOCLAR 8043 | 0.3 | N |
| 24 | ECOCLAR 8043 | 0.9 | N |
| 25 | ECOCLAR 8017 + ECOCLAR 8032 | 0.3 + 0.3 | P |
| 26 | ECOCLAR 8017 | 0.1 | N |

The characteristics of the polyelectrolytes used herein are, with regard to molecular weight and ionicity, the following:

| Polyelectrolyte type | molecular weight (in millions) | ionicity type | meq/g |
|---|---|---|---|
| Ecoclar 8337 | 4–5 | cationic | 4.99 |
| Ecoclar 8032 | 4–5 | cationic | 2.74 |
| Ecoclar 8038 | 6–7 | cationic | 1.23 |
| Cyanamer P250 | 5–6 | non-ionic | — |
| Ecoclar 8008 | 6–7 | non-ionic | — |
| Ecoclar 8002 | 7–8 | anionic | n.d. |
| Ecoclar 8105 | 7–8 | anionic | 4.75 |
| Praestol 444K | 4 | cationic | 4.24 |
| Praestol 334K | 3 | cationic | 3.97 |
| Ecoclar 8043 | 0.25 | cationic | 4.59 | n.d. = not determined index.

EXAMPLE 27 (COMPARATIVE TEST)

The test described in example 2 was repeated, with the difference that instead of 200 ml of aluminum sulphate solution there were utilized 133.6 ml of the same solution and 66.3 ml of an $Al(NO_3)_3.9\ H_2O$ .225 g/l solution. The resulting solution had therefore an $Al^{3+}$ concentration (0.2 moles/l) like that of example 2; the resulting molar ratio $$\frac{SO_4^{--}}{Al^{3+}}$$

was equal to 1.0.

The TEM analysis of the resulting precipitate revealed that it consisted of aggregates of dimensionally polydispersed and morphologically heterogeneous particles with a nearly complete absence of spherical particles.

EXAMPLE 28 (COMPARATIVE TEST)

The test described in example 2 was repeated, with the difference that instead of 200 ml of aluminum sulphate solution there were employed 133.6 ml of the same solution and 66.3 ml of a solution at 144.9 g/l of $AlCl_3.6 H_2O$. The final solution had therefore the same $Al^{3+}$ concentration (0.2 moles/liter) as in example 2; the resulting molar ratio $$\frac{SO_4^{--}}{Al^{3+}}$$

was equal to 1.0. The TEM analysis of the precipitate obtained proved that it consisted of aggregates of dimensionally polydispersed and morphologically heterogeneous particles, although spherical particles could be observed.

EXAMPLE 29

The test of example 2 was repeated by drawing a sample of the slurry as soon as the pH, at the reaction temperature, reached the value of 4.0 (after a heating time of about 50 minutes). Immediately after the sample drawing a 15M NH3 solution was introduced into the reactor till reaching, always at 100° C., a pH value equal to 5.5, and another slurry sample was drawn. In a like manner, after having brought the pH values to 6 and 7 by addition of $NH_3$, further two samples were drawn. The drawn samples were centrifuged, and the precipitates, after washing with water until removal of the $SO_4^{--}$ ions from the filtrate, were dried in an oven at 120° C. to constant weight. On TEM analysis, the samples drawn at pH values equal to 4, 5.5 and 6 resulted to be completely identical with the one of example 2 and consisted essentially of spherical, uniform and almost monodispersed particles having diameters around 0.5 μm.

Conversely, the sample drawn at pH=7 exhibited phenomena of incipient aggregation and of loss of sphericity. On the same samples the % of S was determined, the results being as follows:

| pH at drawing (at 100° C.) | S (% by weight) |
| --- | --- |
| 4 | 6.1 |
| 5.5 | 3.7 |
| 6 | 2.6 |

EXAMPLE 30

The test of example 3 was repeated under the same conditions, except that, when the pH of the suspension reached a pH value of 4 (after about a 80 minute-heating at 100° C.), an aqueous 15M solution of $NH_3$ was added in order to directly bring the pH value to 5.5 by utilizing about 10 ml of said solution. The precipitate was centrifuged, transferred into a beaker and suspended, under stirring, in 100 ml of a $NH_4HCO_3$ solution (25 g/l), while adjusting the pH to a value of 9.5 by addition of a $NH_3$ solution. After a few minutes it was centrifuged, the precipitate was repeatedly washed with $H_2O$, and drying was carried out at 120° C. in an oven till reaching a costant weight (9.3 g). The % of S was determined on the dried product and resulted to be of 0.6%. The TEM analysis indicated that no modification of the hydrated alumina characteristics had occured with respect to the ones of example 3.

EXAMPLE 31

2.0 g of the hydrated alumina obtained in example 30 were calcined in a horizontal furnace at 910° C. during 60 minutes at a temperature increase velocity of 300° C./h. During this test, an air stream was caused to flow in the furnace at a space hourly velocity equal to 15. Obtained were 1.28 g of a powder which, on X-ray analysis, resulted to exclusively consist of $\delta-Al_2O_3$ (standard J.C.P.D.S. No. 16-934). The TEM analysis revealed that the $\delta-Al_2O_3$ particles had retained the spherical morphology and the excellent monodispersion characteristics of the starting hydrated oxide; the particles diameter was lower by about 10% than the one of the starting hydroxide.

EXAMPLE 32

1.0 g of $\delta-Al_2O_3$ obtained in example 31 was calcined at 1300° C. during 120 seconds according to the modalities described in Italian patent application No. 19142 A/85 filed by the Applicant.

Obtained were 0.98 g of a powder which, under X-ray analysis (standard J.C.P.D.S. No. 10-173), resulted to exclusively consist of alpha $Al_2O_3$. The TEM analysis revealed that the particles of alpha $Al_2O_3$ had retained the spherical morphology and the excellent monodispersion characteristics of the starting $\delta-Al_2O_3$. The sulphur content was of 25 ppm.

EXAMPLE 33

2.0 g of the hydrated alumina obtained in example 30 were calcined under the conditions specified in example 32.

Obtained were 1.25 g of powder which, under X-ray analysis, proved to exclusively consist of alpha $Al_2O_3$. The morphological and granulometric characteristics of the powder, as were revealed by TEM analysis, were thoroughly similar to the ones of the alpha $Al_2O_3$ obtained in example 32.

What is claimed is:

1. In a process for homogeneously precipitating hydrated alumina from an aqueous solution comprising aluminum sulphate having an $SO_4/Al^{3+}$ ratio greater than 1 and compounds capable of releasing hydroxy ions so as to avoid local saturation of hydroxy ions in the solution, said hydrated alumina consisting of spherical particles having a diameter of from 0.06 to 3.0 microns and a polydispersion index dw/dn less than or equal to 2, the improvement that comprises carrying out said precipitation in the presence of cationic polyelectrolytes in concentrations at which no separate solution forms, said cationic polyelectrolytes having a mean molecular weight greater than $1.0 \times 10^6$ and an ionicity of at least 3 milliequivalents per gram.

2. The process according to claim 1, wherein the polydispersion index dw/dn is <1.20.

3. The process according to claim 1, wherein the $Al^{3+}$ concentration in the starting solution is 0.6 moles/liter.

4. The process according to claim 3, wherein the $Al^{3+}$ concentration in the starting solution is 0.4 moles/liter.

5. The process according to claim 1, wherein the cationic polyelectrolytes have an ionicity higher than 3.5 milliequivalents per gram and a mean molecular weight higher than 3 million.

6. The process according to claim 1, wherein the cationic polyelectrolyte is employed in amounts which are higher by 2.5% by weight with respect to the theoretical alumina corresponding to the starting aluminum contained in the solution.

7. The process according to claim 6, wherein the cationic polyelectrolyte concentration is higher than or equal to 3.3% by weight.

8. The process according to claim 1, wherein the reaction temperature ranges from 90° to 100° C.

9. The process according to claim 1, wherein the cationic polyelectrolyte comprises repeating units of a substituted acrylamide having the formula:

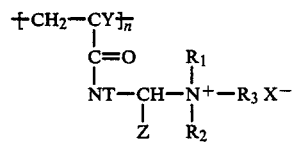

wherein $R_1$, $R_2$, $R_3$ and T are the same or different selected from the group consisting of a hydrogen atom, and a hydrocarbon radical having from 1 to 4 carbon atoms;

Z and Y are selected from the group consisting of a hydrogen atom and —$CH_3$;

X is an anion; and n is an integer.

10. The process according to claim 9, wherein Y, Z and $R_3$ are a hydrogen atom and $R_1$ and $R_2$ are the same or different selected from the group consisting of a hydrogen atom, —$CH_3$ and —$C_2H_5$.

11. The process according to claim 1, wherein the cationic polyelectrolyte comprises repeating units of a vinylamine having the formula:

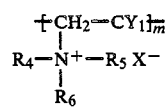

wherein $R_4$, $R_5$ and $R_6$ are selected from the group consisting of a hydrogen atom and a hydrocarbon radical having from 1 to 4 carbon atoms, $Y_1$ is selected from the group consisting of a hydrogen atom and —$CH_3$, and m is an integer X is an anion.

12. The process according to claim 11, wherein $R_4$ is a hydrogen atom and $R_5$ and $R_6$ are the same or different selected from the group consisting of a hydrogen atom, —$CH_3$ and —$C_2H_5$.

13. The process according to claim 9, wherein the polyelectrolyte comprises unsubstituted acrylamide units of the formula:

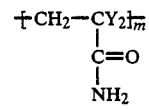

having ionic and non-ionic groups wherein m is an integer, and $Y_2$ is selected from the group consisting of a hydrogen atom and —$CH_3$.

14. The process according to claim 9, wherein the cationic polyelectrolyte is a copolymer comprising cationic and non-ionic units, other than acrylamide.

15. The process according to claim 14, wherein said non-ionic units are selected from the group consisting of:

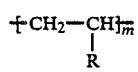 a1

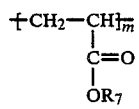 a2

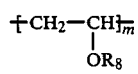 a3

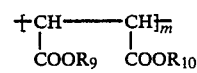 a4

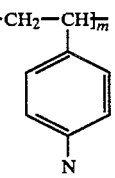 a5 wherein R, $R_7$, $R_8$, $R_9$ and $R_{10}$ are selected from the group consisting of a hydrogen atom and a hydrocarbon radical having from 1 to 4 carbon atoms, and m is an integer.

16. The process according to claim 1, further comprising calcining the precipitated hydrated alumina and wherein the calcined hydrated alumina has a sulphur content of 25 ppm.

17. The process for preparing hydrated alumina according to claim 1, wherein said compounds capable of gradually and uniformly releasing hydroxy ions under the reaction conditions are selected from the group consisting of urea and formamide.

* * * * *